(No Model.) 2 Sheets—Sheet 1.
J. M. LYTLE.
HORSE RAKE ATTACHMENT FOR GRAIN BINDERS.
No. 595,957. Patented Dec. 21, 1897.
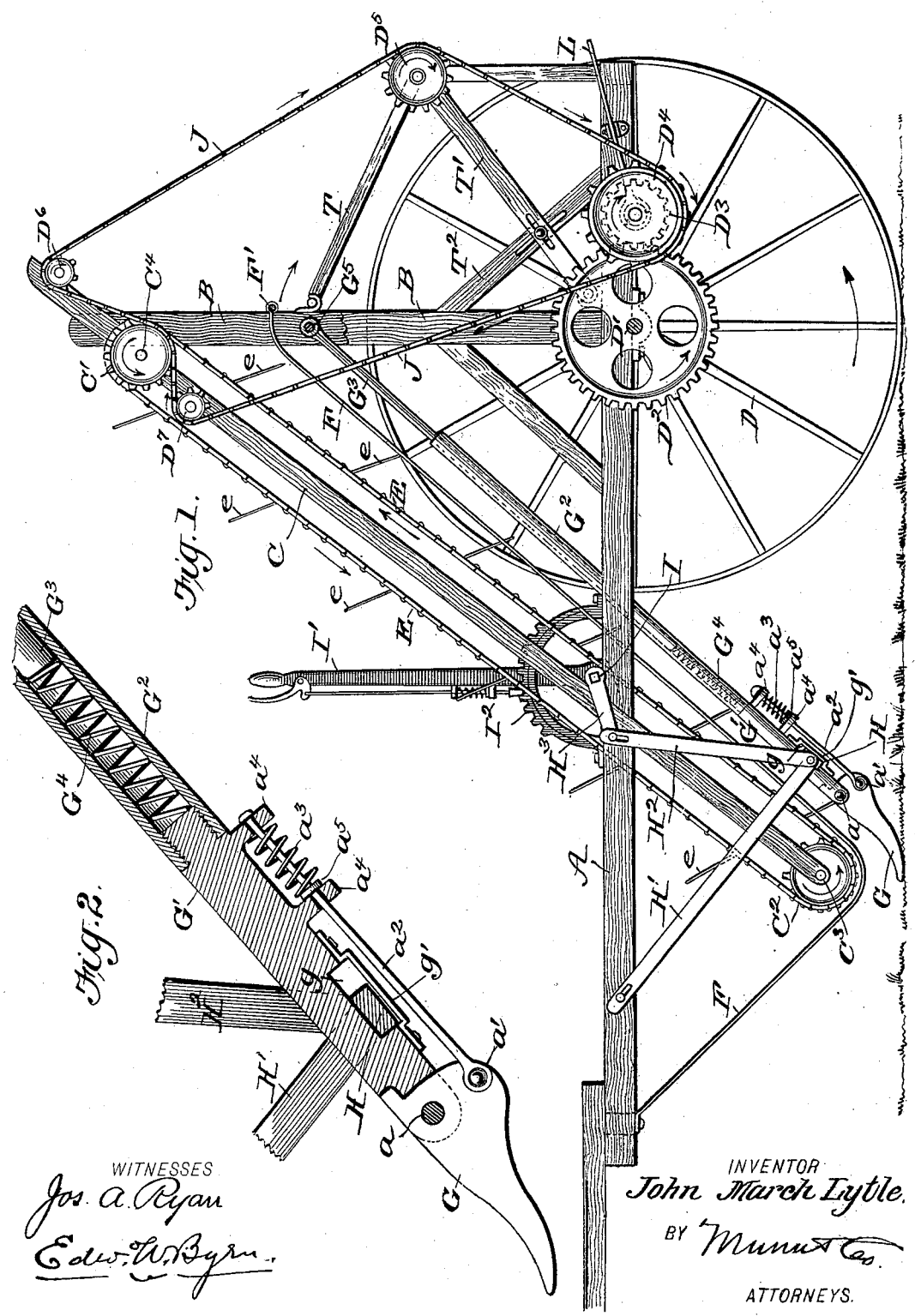
WITNESSES
Jos. A. Ryan
Edw. W. Byrn
INVENTOR
John March Lytle,
BY Munn & Co.
ATTORNEYS.

(No Model.) 2 Sheets—Sheet 2.
J. M. LYTLE.
HORSE RAKE ATTACHMENT FOR GRAIN BINDERS.
No. 595,957. Patented Dec. 21, 1897.
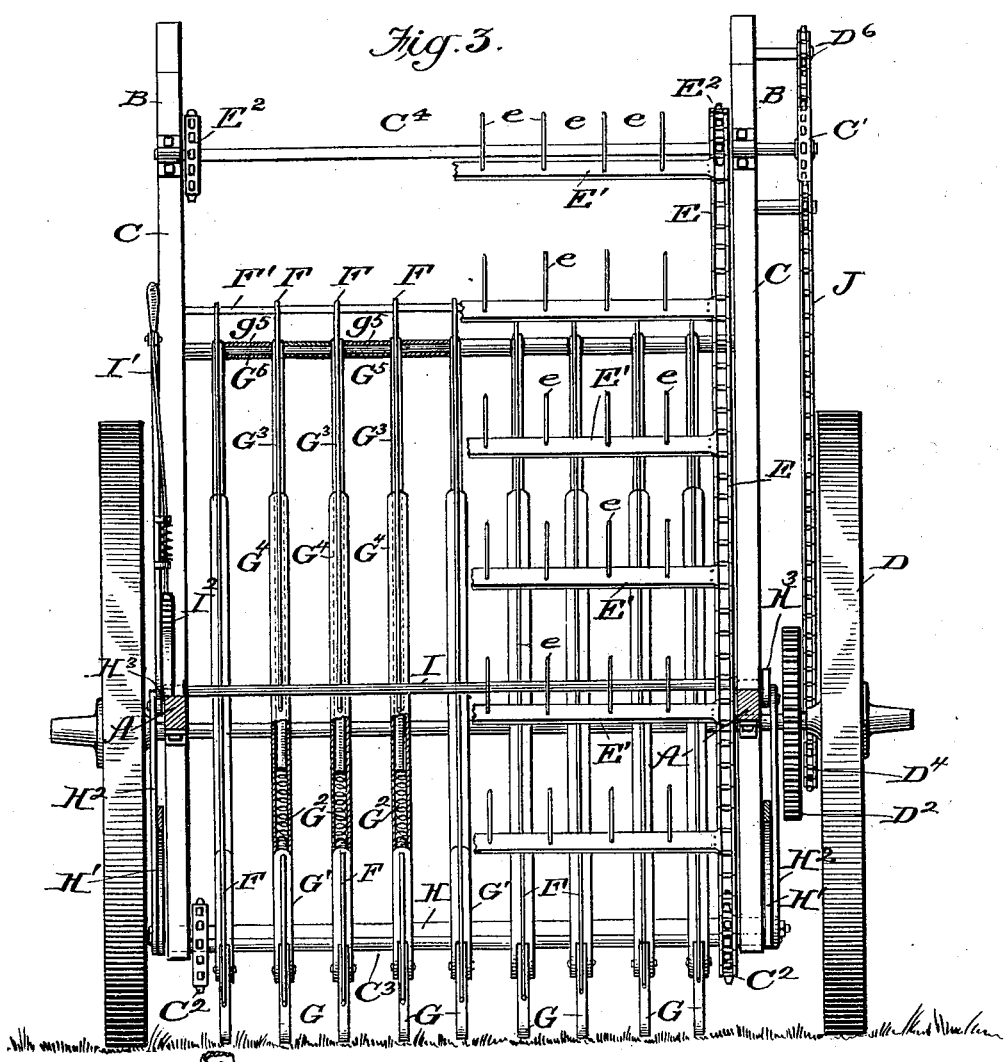
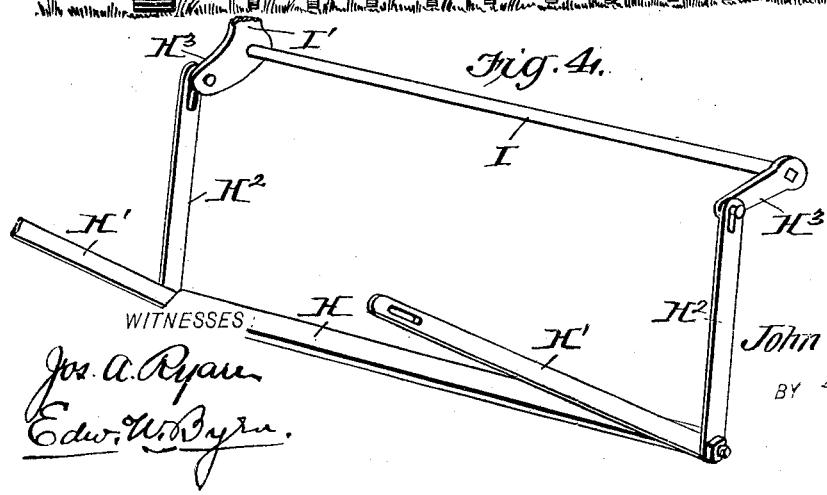
WITNESSES:
Jos. A. Ryan
Edw. W. Byrn.
INVENTOR
John March Lytle.
BY Munn & Co.
ATTORNEYS.
THE NORRIS PETERS CO., PHOTO-LITHO., WASHINGTON, D. C.

UNITED STATES PATENT OFFICE.

JOHN MARCHE LYTLE, OF WHITE HALL, MARYLAND.

HORSE-RAKE ATTACHMENT FOR GRAIN-BINDERS.

SPECIFICATION forming part of Letters Patent No. 595,957, dated December 21, 1897.

Application filed July 28, 1897. Serial No. 646,218. (No model.)

*To all whom it may concern:*

Be it known that I, JOHN MARCHE LYTLE, of White Hall, in the county of Baltimore and State of Maryland, have invented a new and useful Improvement in Horse-Rake Attachments for Grain-Binders, of which the following is a specification.

My invention is in the nature of an improved horse-rake attachment to grain-binders, designed to allow the grain to be cured in the swath as it lies loose on the ground and then be raked up by my machine and bound.

It consists in the peculiar construction and arrangement of the device, as will be hereinafter shown and described, reference being had to the accompanying drawings, in which—

Figure 1 is a side elevation of the rake attachment. Fig. 2 is an enlarged sectional view of one of the rake-teeth and its attached parts. Fig. 3 is a front view of the rake attachment with one-half of the elevator removed and other parts shown in section, and Fig. 4 is a view in perspective of the lifting devices for the rake-teeth.

Referring to Fig. 1, A is the horizontal portion of the main frame, which at its front end is provided with a tongue for the team and at the back end is mounted upon running wheels D on an axle D'. At the rear end there is mounted on the frame A a pair of strongly-braced vertical bars B, whose upper ends are connected to the horizontal frame A by inclined bars C, extending forwardly and downwardly to a point below frame A and near the ground. The upper ends of the inclined bars C carry in suitable journals a shaft $C^4$, with sprocket-wheels $E^2 E^2$, and at their lower ends said bars carry a shaft $C^3$, with sprocket-wheels $C^2 C^2$. Around these sprocket-wheels endless chains E pass, which carry a series of cross-bars E', provided with a series of rake-teeth $e$, forming an elevator for the grain. On the end of the upper shaft $C^4$ there is another sprocket-wheel C', against which bears and engages a drive-chain J, passing around two small sprocket-wheels $D^6 D^7$ on the frame-bar C, a rear sprocket-wheel $D^5$, and a lower sprocket-wheel $D^4$. The latter sprocket-wheel is operated by a gear-wheel $D^3$ on the same shaft therewith, which gear-wheel derives motion from another gear-wheel $D^2$ on the shaft of the running wheels. For connecting and disconnecting the wheels $D^2 D^3$ the usual clutch-coupling with operating-lever L is employed.

As the running wheels D revolve from the movement of the machine over the ground the elevator-belt E is made to revolve in the direction of the arrows and its tines are made to carry the grain up to the binding-table T in connection with other devices, which I will now proceed to describe.

G is a series of rake-teeth, each pivoted at $a$ to a shank G' and arranged to bend backward but not forward with an articulated knuckle-joint, as shown in Fig. 2. To a rear extension of the tooth is jointed at $a'$ a rod $a^2$, passing through guide-lugs $a^4 a^4$ on shank G' and provided between the lugs with a spiral spring $a^3$ and a rigid collar $a^5$, so as to make the tooth G yield backward against the tension of the spring $a^3$ whenever any tooth G strikes a stone or other obstruction. To the upper end of the shank G' is attached a tube $G^2$, containing a spiral spring $G^4$, and in this tube and pressing against this spring is a rod $G^3$, that passes up to and is hinged about a horizontal cross-rod $G^5$, the upper ends being formed with eyes that embrace the said rod and are separated and spaced by thimbles $g^5$.

In each shank G' of each rake-tooth is formed a slot $g$, inclosed by a keeper $g'$, and in each of these slots is retained loosely a cross-bar H, that extends entirely across the machine and is sustained at its ends by hanger-bars H' $H^2$. The upper ends of the bars H' are slotted and connected to the frame A, and the upper ends of the bars $H^2$ are slotted and connected to the arms $H^3$ (see Fig. 4) on a rock-shaft I, which is operated by a hand-lever I', having a detent engaging with a notched bar $I^2$ to hold it to any adjustment. By these devices all of the rake-teeth G may be simultaneously raised or lowered to any desired position or held permanently out of contact with the ground, as is necessary during transportation from place to place. By the springs $a^3$ each tooth is made individually yielding on its pivot $a$. By the springs $G^4$ each is made yielding in the direction of its length, and by the slot $g$ and cross-bar H each can move without disturbing the others.

Between the series of rake-teeth and their tubes $G^4$ and rods $G^3$ on the one hand and the elevator-belt on the other there are a series of guards F. These are connected to the frame A in front, then descend to and pass around the lower end of the elevator-belt, and rise and are attached to a horizontal rod F', fastened to bars B. These guards serve to clear the grain from the fingers of the elevator-belt, and for this purpose said guards are close to the belt at the lower end and gradually deviate from the belt as they rise, so that the fingers of the belt as they rise pull themselves out from between the guards and are cleared thereby from the grain.

The grain, it will be seen, passes up between the rake-teeth and the guards and is delivered upon the table T, leading to the binding devices, which are not shown, it being understood that my devices as herein described may be attached to the binding table or platform of any of the binding devices now in use.

Having thus described my invention, what I claim as new, and desire to secure by Letters Patent, is—

1. A rake for gathering grain in the swath, and elevating it for binding, comprising an endless elevator provided with tines, a series of guard-rods in rear of the same, and a series of rake-teeth in rear of the guards, said rake-teeth being constructed with yielding knuckle-joints, and having shanks with tubular extensions, and spiral springs and rods arranged within said tubular extensions, and means for raising and lowering said rake-teeth together substantially as shown and described.

2. The rake-tooth shank G' having slot $g$, keeper $g'$, and lugs $a^4$ $a^4$, in combination with the articulated tooth G, the rod $a^2$ with collar $a^5$, the spiral spring $a^3$ between the lugs, and the cross-bar H running through the slot $g$ and adjusting the rake-teeth substantially as shown and described.

3. The combination of the triangular frame A B C, elevator-shafts $C^3$ $C^4$ with sprocket-wheels arranged in the bar C and carrying an elevator-belt with tines, a series of rake-teeth G with spring-seated shanks having tubular extensions, the cross-bar H loosely connected with all the shanks and having hanger-bars H' $H^2$, a rock-shaft and hand-lever for raising the rake-teeth, guards F arranged between the elevator and the rake-teeth, and a driving-gear for the elevator connected to and deriving motion from the running-wheels substantially as and for the purpose described.

JOHN MARCHE LYTLE.

Witnesses:
THOMAS LYTLE,
JOSEPH M. PEARCE.